G. E. RIGBY.
SPRING SUSPENSION FOR MOTOR OR OTHER CYCLES.
APPLICATION FILED JULY 8, 1916.

1,261,441.

Patented Apr. 2, 1918.
2 SHEETS—SHEET 1.

Witnesses:
M. E. McAade.

Inventor.
George E. Rigby,
by
James L. Norris,
Attorney.

G. E. RIGBY.
SPRING SUSPENSION FOR MOTOR OR OTHER CYCLES.
APPLICATION FILED JULY 8, 1916.

1,261,441.

Patented Apr. 2, 1918.
2 SHEETS—SHEET 2.

Witnesses:
M. E. McHale
C. L. Kesler

Inventor
George E. Rigby
by
James L. Norris,
Attorney

UNITED STATES PATENT OFFICE.

GEORGE EDWIN RIGBY, OF MANCHESTER, ENGLAND.

SPRING SUSPENSION FOR MOTOR OR OTHER CYCLES.

1,261,441.     Specification of Letters Patent.     Patented Apr. 2, 1918.

Application filed July 8, 1916. Serial No. 108,186.

*To all whom it may concern:*

Be it known that I, GEORGE EDWIN RIGBY, a British subject, residing at the city of Manchester, England, have invented certain new and useful Improvements in Spring Suspensions for Motor or other Cycles, of which the following is a specification.

This invention relates to the spring suspension of motor or other cycles or velocipedes and may be applied to the front or rear wheels.

It consists essentially in the application to leaf, laminated or other springs which carry the axle bearings of two or more upright stays attached or connected to the ends of the springs or to the axle bearings rigidly connected together by one or more cross stays and connected by one or more pairs of links with the steering column or with any other convenient part of the framing.

The invention will be fully described with reference to the accompanying drawings.

Figure 1:
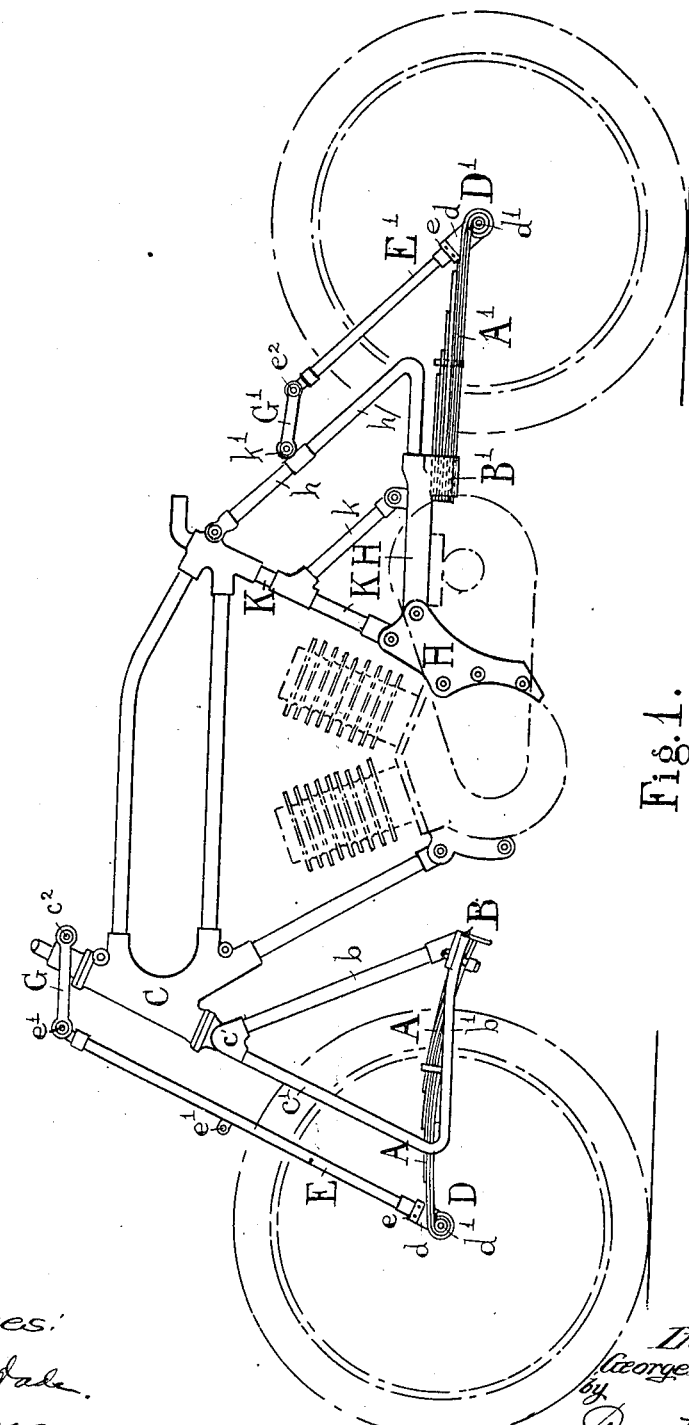

Figure 1 is a side elevation of a motor bicycle constructed in accordance with the invention.

Figure 2:
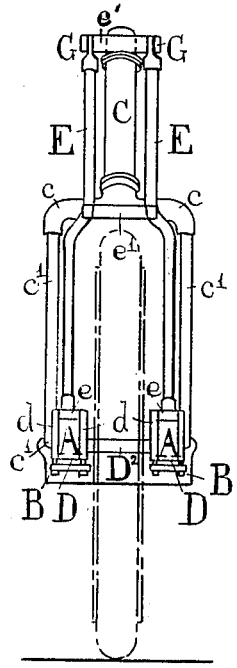

Fig. 2. is a front elevation of front wheel.

Figure 3:
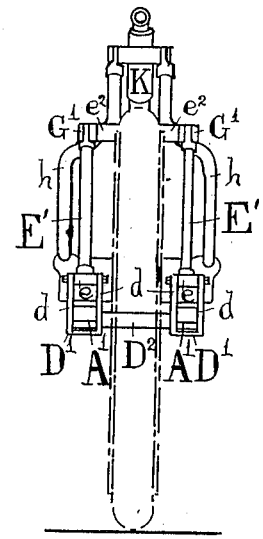

Fig. 3. is a back elevation of rear wheel.

Figure 4:
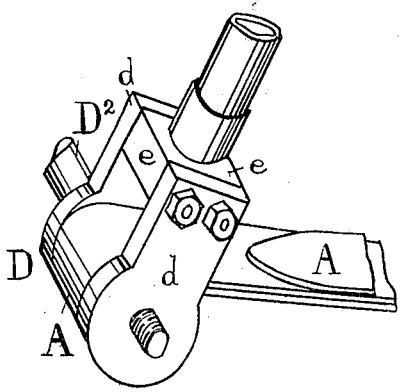

Fig. 4. is a perspective view of the axle bearing.

Figure 5:
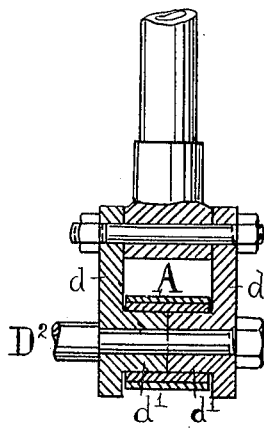

Fig. 5. is a transverse sectional elevation of axle bearing.

Figure 6:
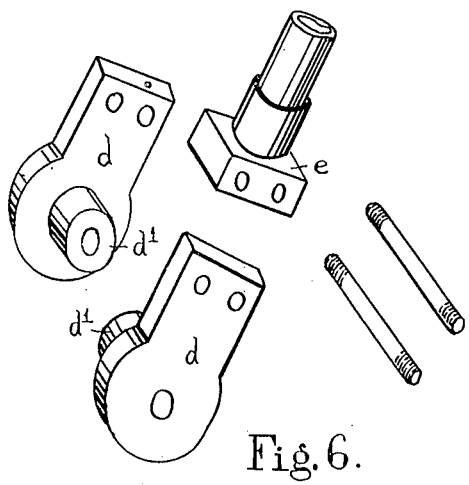

Fig. 6. details of axle bearing.

As applied to the front wheel two laminated or other springs A one at either side of the wheel are secured in a transverse bracket or housing B carried by the steering column C. The steering column is constructed with a fork crown $c$ from which two rearwardly extending members $b$ and two forward members $b'$ $c'$ depend and to the lower ends of the members $b$ and the rear end of $b'$ the spring bracket or housing B is secured.

The axle bearings D are carried by the free ends of the springs A and are formed with two side plates or cheeks $d$ each formed with a bush $d'$ which enter a loop or eye on the end of the spring and through the center the axle $D^2$ passes. The bushes $d'$ formed on the side plates $d$ are together slightly longer than the width of the spring so that when bolted in position freedom of movement of the spring between the plates is permitted. The side plates $d$ are bolted to a cross head $e$ above the spring.

To the axle bearings D two upwardly extending stays E are attached, the lower ends of the stays being brazed into the cross heads $e$ which are bolted to the side plates of the bearing.

The stays E are braced together by a cross strut or struts $e'$ and the top strut $e'$ is tubular with a spindle extending through it to give a long bearing.

The upright stays E are connected to the steering column C by pairs of links G to insure equal deflection of the springs A and prevent lateral sway or rocking of the wheel. The links G fit on to the ends of the spindle in the tubular cross strut $e'$ and on to a spindle in a tubular socket $c^2$ on the steering column. Additional links of similar construction may if desired be pivoted to the fork crown but at present I consider that one pair of links is preferable as giving a greater freedom of action to the upright stays E.

As applied to the rear wheel two laminated or other springs A' one at either side of the wheel are secured in a transverse housing or bracket B' carried by or rigidly secured to the engine bracket H or other part of the frame, and this bracket is stayed to the seat pillar tube K by a stay $k$ to give vertical stability thereto. To the end of the bracket H and to the top frame a strut or brace $h$ is attached to give additional rigidity thereto. This is preferably angular as shown or it may be straight with the top frame extended to a greater distance to the rear.

The axle bearings D' are carried by the free ends of the springs A' and are formed with two side plates or cheeks $d$ each of which is formed with a bush $d'$ which enters a loop or eye on the end of the spring and through the center the axle passes. The bushes $d'$ formed on the side plates $d$ are together slightly longer than the width of the spring so that when bolted in position freedom of movement of the spring between the plates is permitted. The side plates $d$ are bolted to a cross head $e$ above the spring.

To the axle bearings D' two upwardly extending stays E' are attached the lower ends of the stays being brazed to the cross heads $e$ which are bolted to the side plates of the bearing. The stays E' are braced together by a cross strut or struts $e^2$ and the top strut $e^2$ is tubular with a spindle extending through it to give a long bearing.

The upright stays E' are connected to the brace $h$ (or it may be connected to the rear end of the top frame or saddle tube) by pairs of links G' to insure equal deflection of the springs A' and prevent lateral sway or rocking of the wheel. The links G' fit on to the ends of the spindle in the tubular cross strut $e^2$ and on to a spindle in the tubular socket K' on the brace or strut $h$ (or on the rear end of the top frame).

The strut or brace $h$ may be straight or of angular or other form.

Two or more pairs of such links may be similarly pivoted but at present I consider that one pair of links is sufficient giving a greater freedom of action to the stays E'.

What I claim as my invention and desire to protect by Letters Patent is:—

1. Spring suspension means for wheels of motors and the like, comprising a frame, laminated springs having a housing at one end and directly carrying axle bearings at the other free end thereof, an angular strut connected to said housings and adding rigidity to the housing structure, a pair of upright stays braced together and rigidly attached to the axle bearings, and links connected to the stays and to an adjacent part of the frame to insure equal deflection of the springs and prevent lateral sway of the motor wheel.

2. In a spring suspension means for a motor or other wheel, a frame, rearwardly inclined members fixed to a part of the frame, angular struts attached to the inclined members, the said inclined members supporting a bracket, laminated springs connected at one end to the bracket, axle bearings attached to the opposite ends of the springs whereby the springs at one end directly coöperate with the bearings, a pair of upwardly projecting stays rigidly attached to the axle bearings, and a pair of links movably connected to the stays and to a part of the frame and acting with the stays to prevent lateral sway of the wheel.

3. In a spring suspension for the wheels of motor cycles or velocipedes the combination with a transverse housing and laminated springs affixed thereto at one end and carrying an axle bearing at the other end composed of two side plates each formed with a bush to enter a loop in the end of the spring the bushes being slightly longer than the width of the spring, a cross head to which the side plates are bolted and an upright stay rigidly secured thereto substantially as described.

4. In a motor cycle, the combination with a frame and wheels having axle bearings, of laminated spring units connected at their outer ends directly to the bearings of each wheel, a rigid housing to which the inner end of each spring unit is attached, two rearwardly extending struts connected to and supporting the housing, upwardly extending stays rigidly attached to the axle bearings, and links pivotally attached to a part of the frame and to the stays.

5. A motor cycle of the character specified comprising in its construction a frame and fore and rear wheels, a steering column coöperating with the fore wheel, rearwardly extending struts attached to the column, a transverse housing carried by the struts to swing with the column, bearings for the axle of the fore wheel, upright stays secured to the said bearings, and links pivoted to the stays and to the steering column.

In testimony whereof I have hereunto set my hand in presence of two subscribing witnesses.

GEORGE EDWIN RIGBY.

Witnesses:
J. OWDEN O'BRIEN,
GEORGE H. O'BRIEN.